(12) United States Patent
Moore et al.

(10) Patent No.: US 7,320,551 B1
(45) Date of Patent: Jan. 22, 2008

(54) OPTOELECTRONIC MODULE CLASSIFICATION CLIP

(75) Inventors: Joshua Moore, Sunnyvale, CA (US); Daehwan Daniel Kim, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/738,369

(22) Filed: Apr. 20, 2007

Related U.S. Application Data

(60) Provisional application No. 60/910,793, filed on Apr. 9, 2007.

(51) Int. Cl.
*G02B 6/36* (2006.01)
(52) U.S. Cl. .............. 385/92; 385/88; 385/76; 385/77
(58) Field of Classification Search .............. 385/14, 385/88, 89, 92, 93, 94, 76, 77, 78; 398/135, 398/138, 139
See application file for complete search history.

(56) References Cited

U.S. PATENT DOCUMENTS

| | | | | |
|---|---|---|---|---|
| 3,977,104 A | * | 8/1976 | Stupar | 40/316 |
| 4,011,673 A | * | 3/1977 | Levine | 40/641 |
| 5,127,070 A | * | 6/1992 | Blomgren | 385/55 |
| 5,394,503 A | * | 2/1995 | Dietz et al. | 385/135 |
| 5,793,909 A | * | 8/1998 | Leone et al. | 385/24 |
| 6,243,510 B1 | * | 6/2001 | Rauch | 385/15 |
| 6,256,443 B1 | * | 7/2001 | Uruno et al. | 385/134 |
| 6,366,724 B1 | * | 4/2002 | Jennings et al. | 385/48 |
| 6,873,779 B1 | * | 3/2005 | Sonderegger et al. | 385/136 |
| 2005/0281527 A1 | * | 12/2005 | Wilson et al. | 385/135 |

* cited by examiner

*Primary Examiner*—Brian M. Healy
(74) *Attorney, Agent, or Firm*—Workman Nydegger

(57) ABSTRACT

A classification clip for an electronic or optoelectronic module. In one example embodiment, an optoelectronic module classification clip includes a body, a complementary structure attached to the body and configured to engage a complementary structure of a shell of an optoelectronic module, and a visible indicator included on at least a portion of the body or the complementary structure. The visible indicator indicates information concerning a characteristic of the optoelectronic module.

20 Claims, 7 Drawing Sheets

OPTOELECTRONIC MODULE CLASSIFICATION CLIP

CROSS-REFERENCE TO RELATED APPLICATION

This application claims priority to U.S. Provisional Patent Application Ser. No. 60/910,793, filed on Apr. 9, 2007, which is incorporated herein by reference in its entirety.

BACKGROUND

Optoelectronic modules, such as optoelectronic transceiver or transponder modules, are increasingly used in electronic and optoelectronic communication. Some optoelectronic modules can be plugged into a variety of host devices. Multi-Source Agreements ("MSAs"), such as the SFF MSA, the SFP MSA, the SFP+ (IPF) MSA, and the XFP MSA, specify, among other things, package dimensions for electronic and optoelectronic modules. Conformity with an MSA allows an electronic or optoelectronic module to be plugged into host devices designed in compliance with the MSA.

Optoelectronic modules typically communicate with a printed circuit board of a host device by transmitting electrical signals to the printed circuit board and receiving electrical signals from the printed circuit board. These electrical signals can then be transmitted by the optoelectronic module outside the host device as optical signals.

One common difficulty associated with optoelectronic modules concerns the retention and removal of the optoelectronic modules within and from corresponding cages of host devices. Although various mechanisms have been developed in order to facilitate the retention and removal of optoelectronic modules within and from corresponding cages of host devices, these mechanisms can be problematic in certain applications. For example, an SFP+ optoelectronic module can include a bail-actuated latch mechanism that facilitates the removal of the SFP+ optoelectronic module from a cage of a host device without the use of a separate tool. The bail-actuated latch mechanism can also include certain visible indicators that serve to identify one or more characteristics, such as wavelength or data rate, of the SFP+ optoelectronic module.

Although enabling the removal of an SFP+ optoelectronic module from a cage of a host device without necessitating the use of a separate tool is generally desirable, certain applications, sometimes known as "single-insertion" applications, may require that the SFP+ optoelectronic module only be removable from a cage of a host device by use of a separate tool. Requiring a separate tool to remove an SFP+ optoelectronic module from a cage of a host device can increase the likelihood, for example, that the module is only removed from the cage by the original manufacturer or vendor of the host device and not by an end user of the host device.

One approach to designing an SFP+ optoelectronic module that is appropriate for a single-insertion application is to eliminate entirely, a bail-actuated latch mechanism from the module. This approach, however, also results in the undesirable elimination of the visible indicators of the bail-actuated latch mechanism that serve to identify characteristics of the SFP+ optoelectronic module. The elimination of these visible indicators can make the identification of characteristics of the SFP+ optoelectronic module, such as wavelength or data rate, difficult. This difficulty can arise in part because once an SFP+ optoelectronic module is inserted into a cage of a host device, certain descriptive labels on the SFP+ optoelectronic module may be hidden by the cage, and can not be viewed without the use of a separate tool.

SUMMARY OF SOME EXAMPLE EMBODIMENTS

In general, example embodiments of the invention relate to a classification clip for an electronic or optoelectronic module. The example classification clip can include indicators, such as visible indicators, that serve to identify characteristics of the optoelectronic module to which the classification clip is attached. The example classification clip can also be employed to limit the range of motion of clips of optical connectors that are positioned within transmit and receive ports of the optoelectronic module to which the classification clip is attached.

In one example embodiment, an optoelectronic module classification clip includes a body, a complementary structure attached to the body and configured to engage a complementary structure of a shell of an optoelectronic module, and a visible indicator included on at least a portion of the body or the complementary structure attached to the body. The visible indicator indicates information concerning a characteristic of the optoelectronic module.

In another example embodiment, an optoelectronic module classification clip includes a base, a pair of arms extending from the base, and a protrusion extending from each arm. Each arm is configured to engage a complementary structure of a shell of an optoelectronic module. Each protrusion configured to be received by a complementary cavity defined by the shell. Also, at least a portion of the base or one of the arms includes a color that corresponds to a wavelength associated with the optoelectronic module.

In yet another example embodiment, an optoelectronic module includes a shell, a transmit port defined in the shell, a receive port defined in the shell, and a classification clip. The classification clip includes a body, a complementary structure attached to the body and configured to engage a complementary structure of the shell, and a visible indicator included on at least a portion of the body or the complementary structure attached to the body. The visible indicator indicates information concerning a characteristic of the optoelectronic module.

These and other aspects of example embodiments of the present invention will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the present invention relate to a classification clip for an electronic or optoelectronic module. The example classification clip can include indicators, such as visible indicators, that serve to identify characteristics of the optoelectronic module to which the classification clip is attached. The example classification clip can also be employed to limit the range of motion of clips of optical connectors that are positioned within transmit and receive ports of the optoelectronic module to which the classification clip is attached.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Optoelectronic Module

Figure 1A:
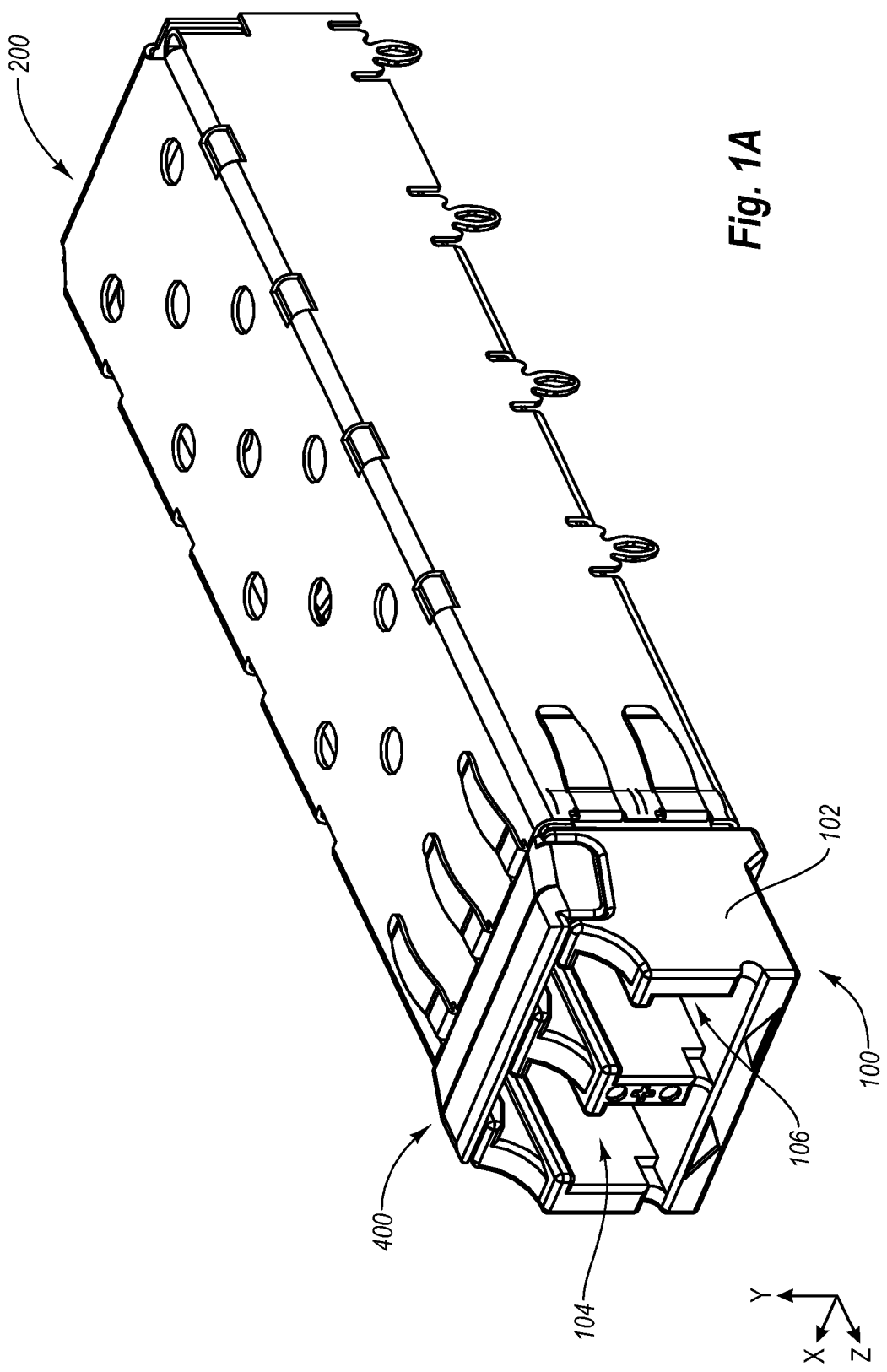
FIG. 1A is a top perspective view of an example optoelectronic module, including an example classification clip, where the optoelectronic module is positioned within an example cage of a host device.
Figure 1B:
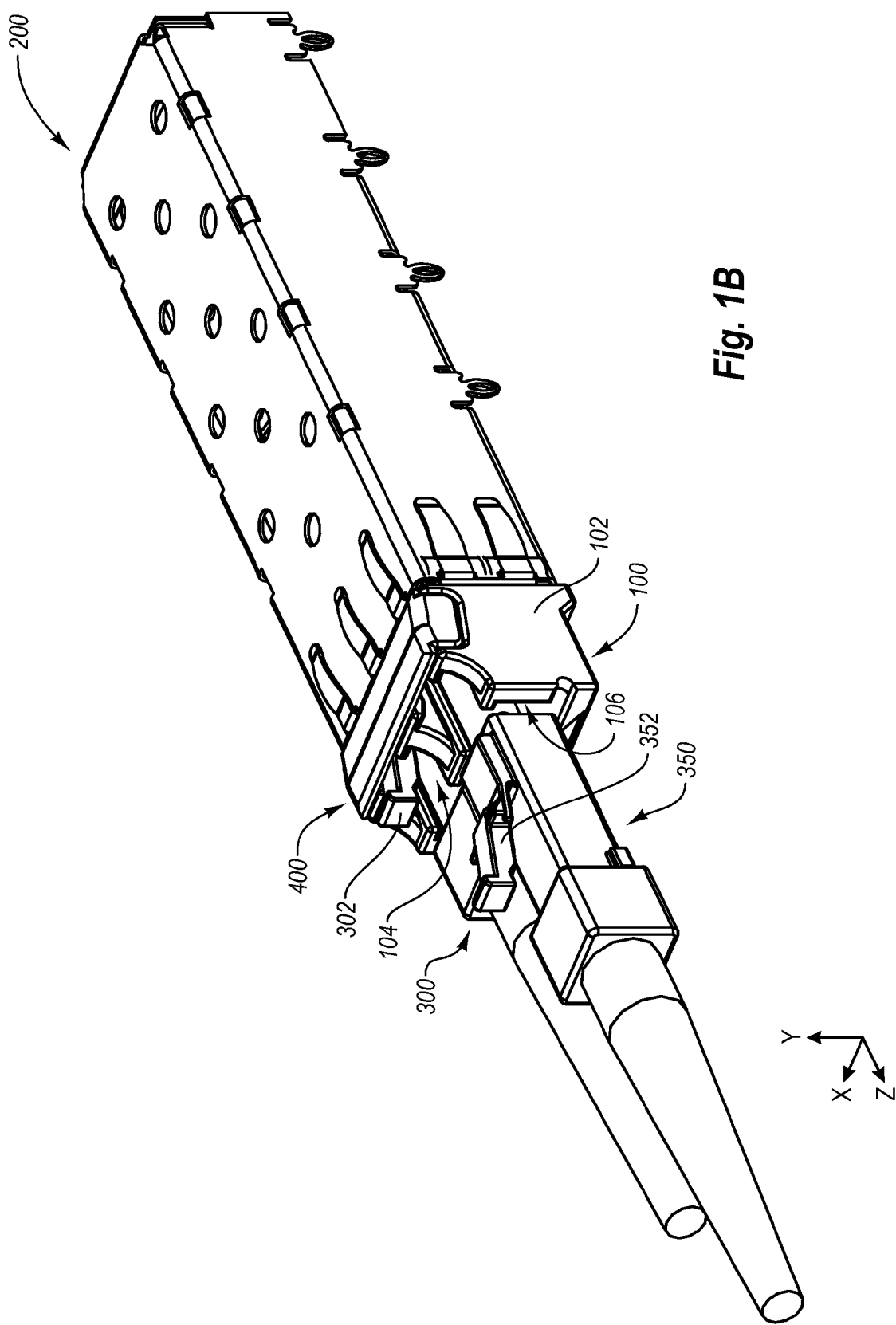
FIG. 1B is another top perspective view of the example optoelectronic module of FIG. 1A as positioned within the example cage of FIG. 1A, along with two example optical connectors.
Figure 1C:
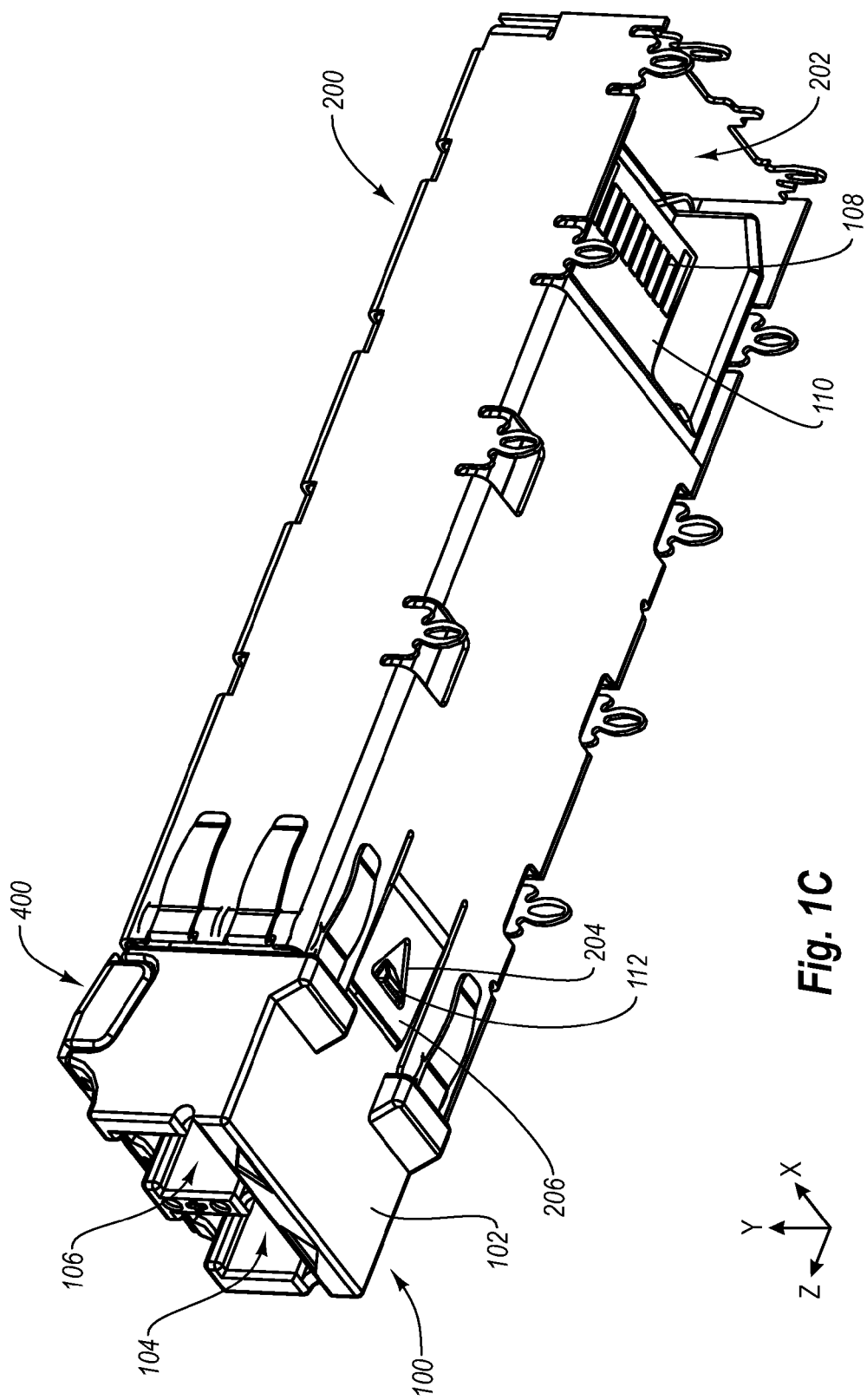
FIG. 1C is a bottom perspective view of the example optoelectronic module of FIG. 1A as positioned within the example cage of FIG. 1A.

Reference is first made to FIGS. 1A-1C which disclose an example optoelectronic module 100 positioned within an example cage 200. As disclosed in FIGS. 1A-1C, the module 100 includes various components including a shell 102, and a transmit port 104 and a receive port 106 defined in the shell 102. In one example embodiment, the shell 102 can be formed using a die casting process. One example material from which the shell 102 can be die cast is zinc, although the shell 102 may alternatively be die cast, or otherwise manufactured from other suitable materials. In one example embodiment, the shell 102 may also include a copper-nickel plating.

The module 100 can be configured for optical signal transmission and reception at a variety of data rates including, but not limited to, 1 Gb/s, 2 Gb/s, 2.5 Gb/s, 4 Gb/s, 8 Gb/s, 10 Gb/s, or higher. Furthermore, the module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the module 100 can be configured to support various communication protocols including, but not limited to, Fast Ethernet, Gigabit Ethernet, 10 Gigabit Ethernet, and 1x, 2x, 4x, and 10x Fibre Channel. In addition, although one example of the module 100 is configured to have a form factor that is substantially compliant with the SFP+ (IPF) MSA, the module 100 can alternatively be configured in a variety of different form factors that are substantially compliant with other MSAs including, but not limited to, the SFF, SFP, or the XFP MSAs. Finally, although the module 100 is an optoelectronic transceiver module, example embodiments of the present invention can alternatively be implemented in optoelectronic transponder modules, electronic transceiver modules, or electronic transponder modules.

With particular reference now to FIG. 1B, aspects of two example optical connectors 300 and 350 are disclosed. The example optical connector 300 is configured to be removably received within the transmit port 104 and the example optical connector 350 is configured to be removably received within the receive port 106. Although the optical connectors 300 and 350 are configured as LC optical connectors, the optical connectors 300 and 350 could alternatively be configured with other optical connector form factors, including SC.

The optical connectors 300 and 350 include clips 302 and 352, respectively. The clip 302 is configured to bias against, and engage, corresponding structure (not shown) of the transmit port 104 in order that the optical connector 300 is retained within the transmit port 104. In addition, the clip 302 is configured to be depressed by a user, such that the clip 302 is thereby disengaged from the corresponding structure (not shown) of the transmit port 104, thus allowing the optical connector 300 to be extracted from the transmit port 104. In at least one embodiment, the structure and function of clip 352 is identical to the clip 302.

With particular reference now to FIG. 1C, the cage 200 defines an opening 202. The opening 202 allows access to an edge connector 108 of a printed circuit board 110. In general, the printed circuit board 110 is partially positioned within the shell 102 and configured to facilitate an electrical connection between the module 100 and a printed circuit board (not shown) of the host device (not shown) to which the cage 200 corresponds.

Also disclosed in FIG. 1C, the shell 102 of the module 100 includes a post 112 that is configured to extend through an opening 204 defined in a tab 206 formed in the cage 200, thus engaging the post 112 with the tab 206. The post 112 and the tab 206 function together to maintain the module 100 within the cage 200. The tab 206 can also be bent away from the post 112 in order to allow the post 112 to be disengaged from the tab 206, thus allowing the module 100 to be extracted from the cage 200.

Figure 2B:
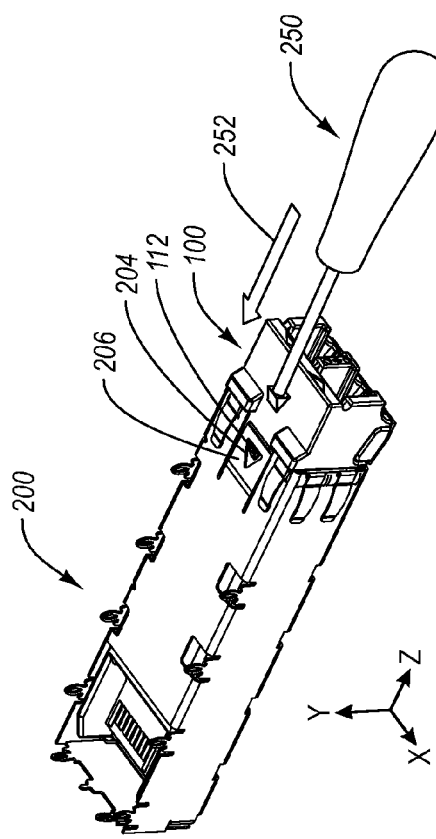
FIGS. 2A-2D are various bottom perspective views disclosing operation of a extraction tool with respect to the example optoelectronic module of FIG. 1A and the example cage of FIG. 1A.
Figure 2D:
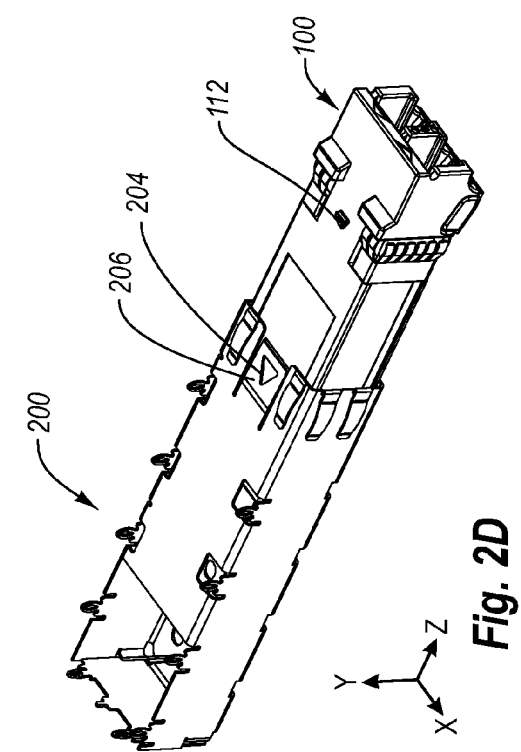
Figure 2A:
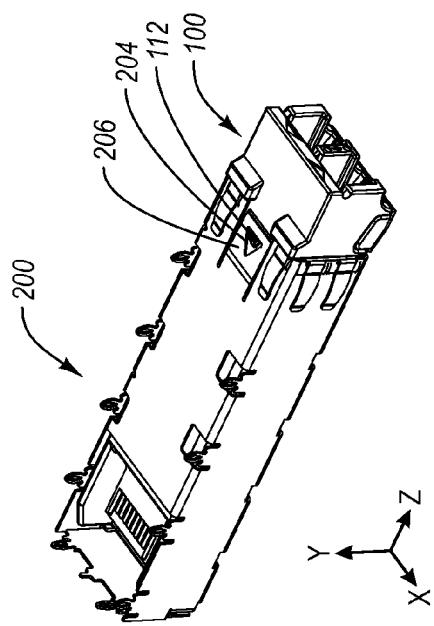
Figure 2C:
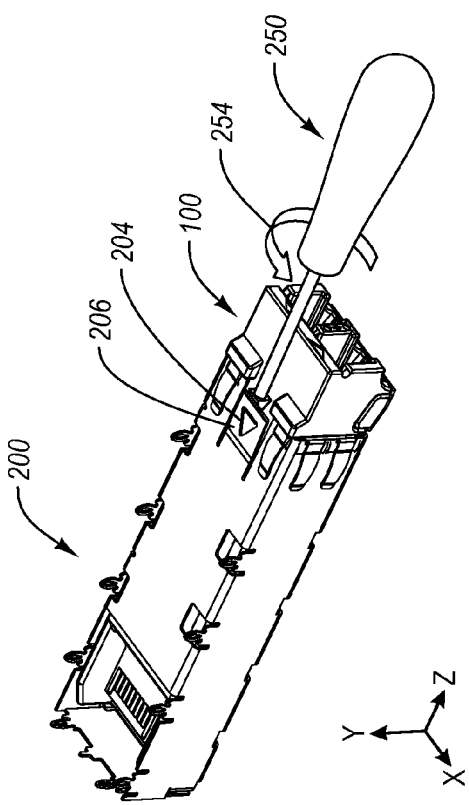

With reference now to FIGS. 2A-2D, additional details regarding the extraction of the module 100 from the cage 200 are disclosed. FIG. 2A discloses the module 100 positioned within the cage 200, such that the post 112 of the module 100 extends through the opening 204 defined in the tab 206 and is engaged with the tab 206. FIG. 2B discloses an example extraction tool denoted at 250, which can be inserted underneath the tab 206 in the direction of the arrow 252. FIG. 2C discloses the extraction tool 250 inserted underneath the tab 206, and then rotated about 90° s shown by the arrow 254. This rotation of the extraction tool 250 causes the tab 206 to be temporarily bent away from the post 112 such that the post 112 no longer extends through the opening 204 of the tab 206, and thus no longer engages the tab 206. As disclosed in FIG. 2D, temporarily bending the tab 206 away from the post 112 allows the module 100 to be extracted from the cage 200 in the direction of the arrow 256.

Thus, the example module 100 can be extracted from the example cage 200, despite the fact that the module 100 lacks a bail-actuated latch mechanism. The required use of an extraction tool, such as the extraction tool 250, can make the module 100 appropriate for employment in single-insertion or limited-insertion applications. However, as disclosed below in connection with the classification clip, the lack of a bail-actuated latch mechanism in module 100 does not leave the module 100 devoid of visible indicators that serve to identify characteristics of the module 100.

2. Example Classification Clip

Figure 3A:
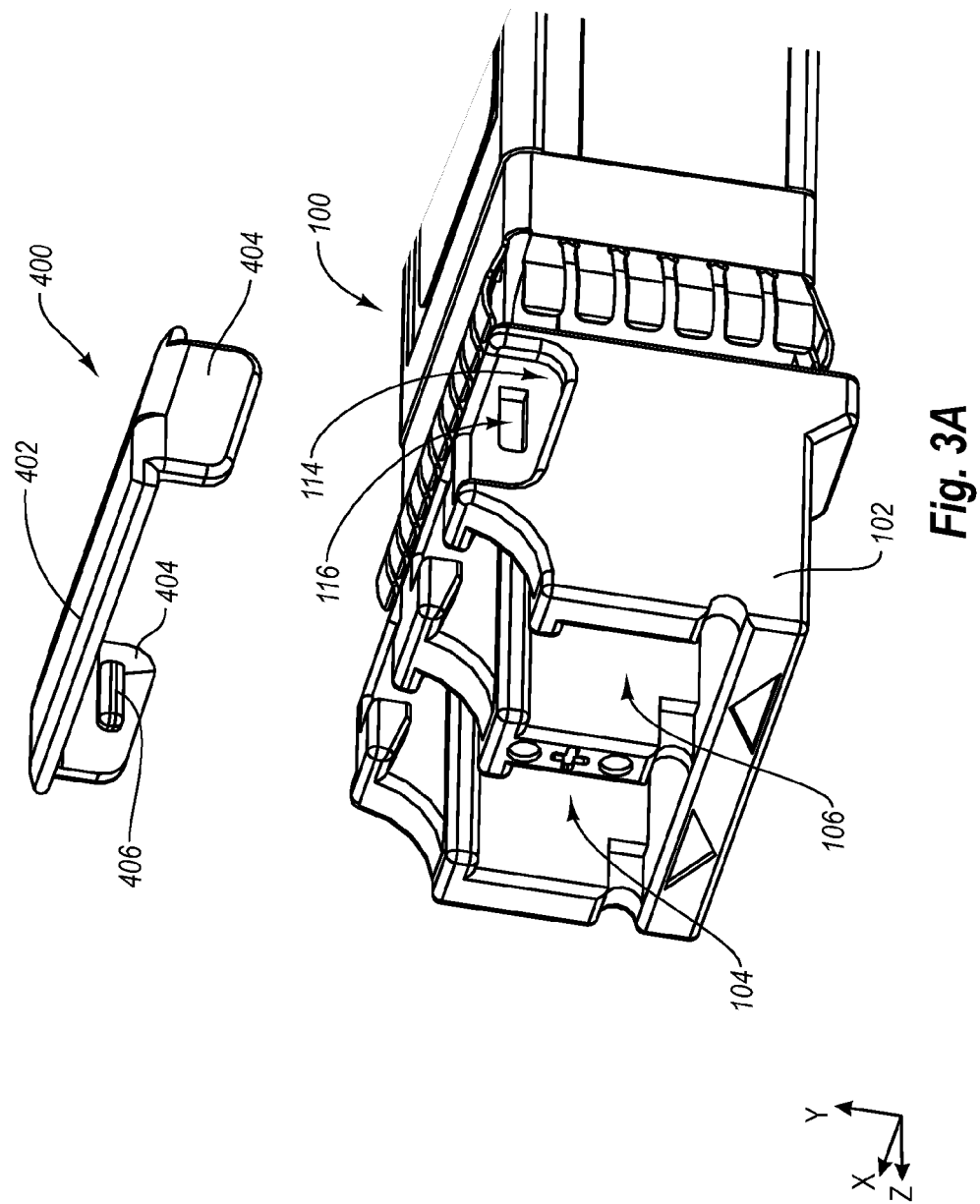
FIG. 3A is an exploded front perspective view of the example optoelectronic module and the example classification clip of FIG. 1A.
Figure 3B:
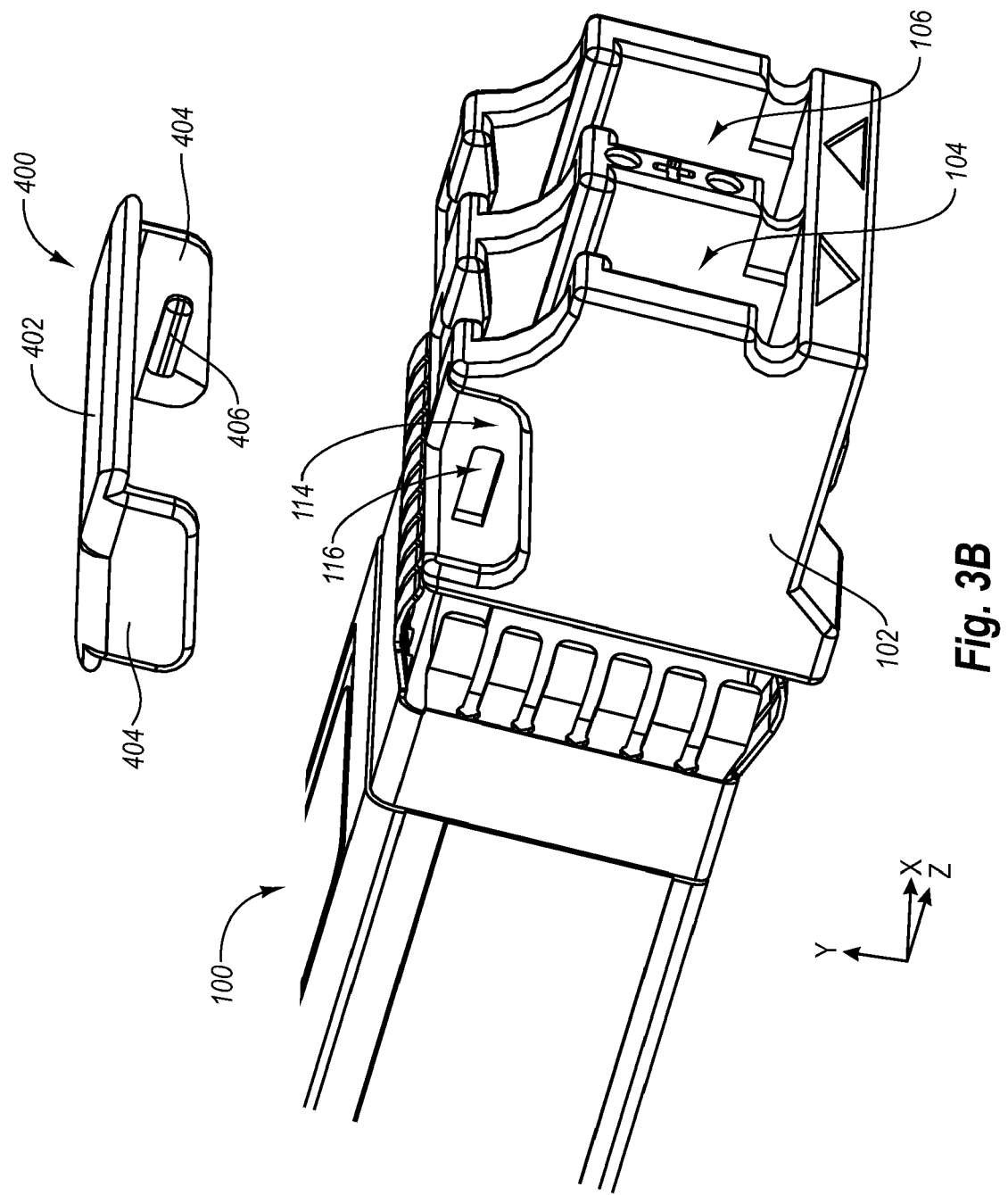
FIG. 3B is another exploded front perspective view of the example optoelectronic module of FIG. 1A and the example classification clip of FIG. 1A.
Figure 3C:
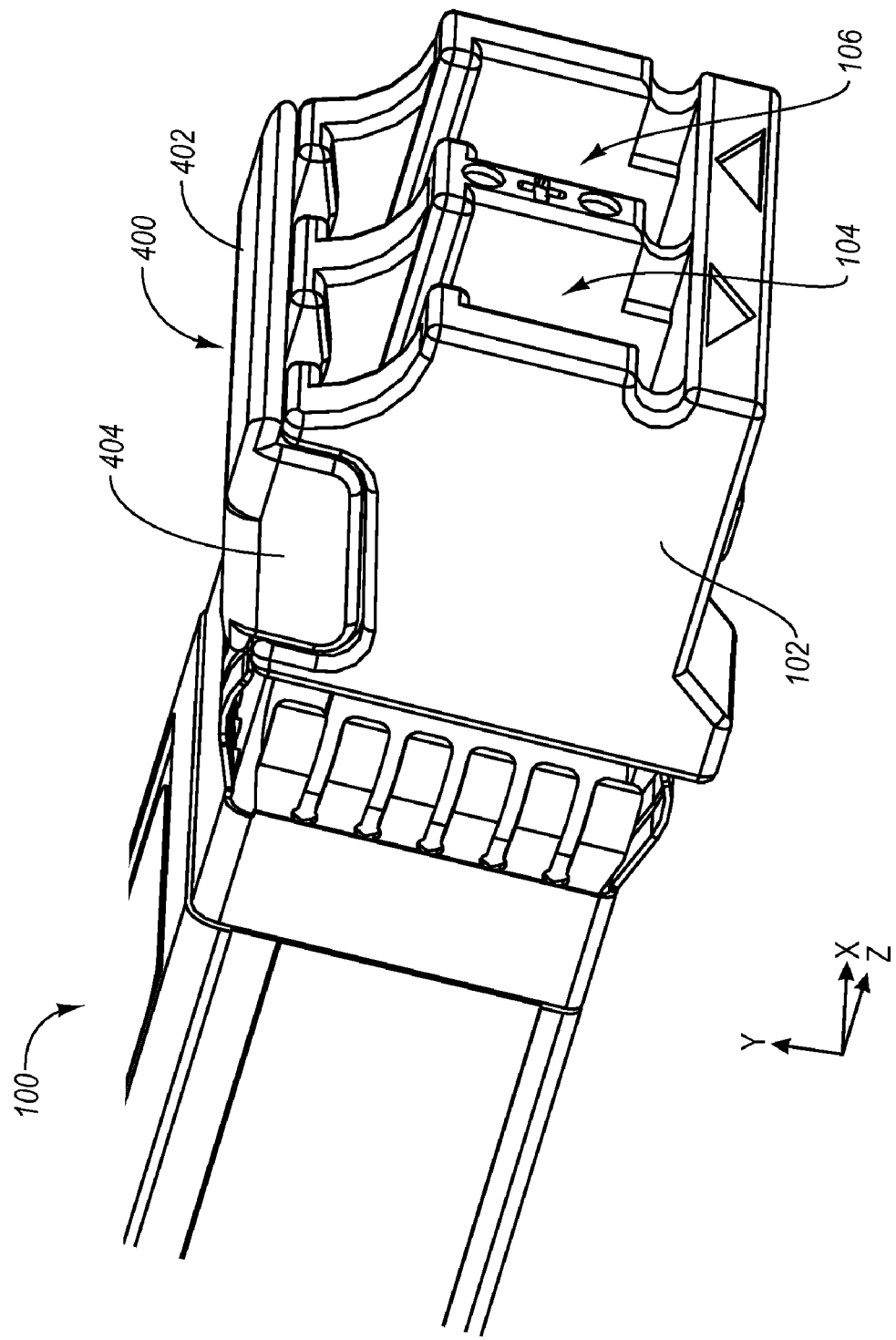
FIG. 3C is a front perspective view of the example optoelectronic module of FIG. 1A and the example classification clip of FIG. 1A.

With continued reference to FIGS. 1A-1C, and with reference also to FIGS. 3A-3C, the module 100 also includes an example classification clip 400 that can be attached to the shell 102. In one example embodiment, the classification clip 400 can be configured to be positioned above the transmit and receive ports 104 and 106, as disclosed in FIG. 1B. In this position, the classification clip 400 can function as a stop for the clips 302 and 352 of the optical connectors 300 and 350. While functioning as a stop, the classification clip 400 can limit the range of motion of the clips 302 and 352 and thereby prevent damage to the clips 302 and 352 caused by over-rotation of the clips 302 and 352 away from the optical connectors 300 and 350, respectively.

With continued reference to FIGS. 3A-3C, the example classification clip 400 can be formed from any suitable flexible material including, but not limited to, rubber, stainless steel, metal, or plastic such as polyamide 66 (PA66), Ultem®, polycarbonate, or acrylonitrile butadiene styrene (ABS). One method by which the classification clip 400 can be formed is injection molding, although other manufacturing processes can alternatively be employed. Further, the classification clip 400 can be formed as a monolithic component, or formed as a composite component that is assembled from multiple components. In addition, at least some portion of the example classification clip 400 can include, be formed from, or be coated with, one or more visible indicators that serve to identify characteristics of the module 100.

The visible indicators of the example classification clip 400 can include, for example, color-coded portions, raised or depressed characters, printed characters, or any other visible indicator that can serve to identify characteristics of the module 100. The term "characters" as defined herein refers to letters, numbers, punctuation, any other symbol, and any combination thereof. The characteristics of the module 100 that can be identified by the visible indicators of the classification clip 400 can include, but are not limited to, the data rate, wavelength, communication protocol, form factor, manufacturer, or vendor of the module 100.

In one example embodiment, a single visible indicator of the classification clip 400 can serve to identify a single characteristic of the module 100. In another example embodiment, a single visible indicator of the classification clip 400 can serve to identify multiple characteristics of the module 100. In yet another example embodiment, the classification clip 400 can include multiple visible indicators that each serve to identify one or more characteristics of the module 100.

In one example embodiment, the classification clip 400 can be formed from, or coated with, a black material if the module 100 has a wavelength of 1310 nm. As another example, if the module 100 has a wavelength of 1610 nm, the classification clip 400 can be formed from, or coated with, a blue material. In another example, the classification clip 400 can include raised characters that indicate the wavelength of the module 100.

With reference again to FIGS. 3A and 3B, the example classification clip 400 includes a body and one or more complementary structures configured to engage corresponding complementary structures of the shell 102. For example, the body of the classification clip 400 can include a base 402. The complementary structures of the classification clip 400 can include a pair of arms 404 extending from the base 402 and a protrusion 406 extending from each arm 404. The complementary structures of the shell 102 can include a pair of recesses 114 formed in the shell 102 a pair of cavities 116 formed in the recesses 114 of the shell 102. Each of the arms 404 can be sized and configured to engage one of the pair of recesses 114. In addition, each of the protrusions 406 can be sized and configured to engage one of the pair of cavities 116. The complementary structures disclosed in FIGS. 3A and 3B are only example complementary structures, and other complementary structures could alternatively be employed to attach the classification clip 400 to the shell 102, or other portion, of the module 100.

The classification clip 400 can be attached to the shell 102 of the module 100 by temporarily flexing the arms 404 away from each other and slipping the classification clip 400 over the corresponding portion of the shell 102. After properly aligning the classification clip 400 over the shell 102, the arms 404 of the classification clip 400 can be released in order to allow the arms 404 to engage the shell 102, as disclosed in FIG. 3C.

Similarly, the classification clip 400 can be detached from the module 100 by inserting a tool, such as the extraction tool 250 disclosed in FIGS. 2B and 2C, between the shell 102 and one of the arms 404 of the classification clip 400, and prying the arm 404 away from the shell 102. The flexible nature of the classification clip 400 will enable the arm 404 to be temporarily flexed, thus allowing the disengagement of the protrusion 406 from the corresponding cavity 116, after which the classification clip 400 can be rotated away from the module 100.

In one example embodiment, when the classification clip 400 is attached to the module 100, the outside surfaces of the arms 404 are substantially flush with the adjacent surfaces of the shell 102, as disclosed in FIG. 3C. This substantially flush configuration can help prevent the inadvertent detachment of the classification clip 400 from the module 100 by helping to avoid the inadvertent snagging of the arms 404 on, for example, adjacent modules or devices during insertion or extraction of the module 100 from the cage 200.

The example classification clip 400 disclosed herein can be used to facilitate the rapid and reliable identification of characteristics of the optoelectronic module 100. The example classification clip 400 disclosed herein can also be detached from the optoelectronic module 100 in order to replace the example classification clip 400 with another classification clip. The example classification clip 400 can also be employed to operate in connection with other elements of the module 100, such as limiting the range of motion of clips of optical connectors, such as the clips 302 and 352 of the optical connectors 300 and 350, that are positioned within the transmit and receive ports 104 and 106 of the module 100. The example classification clip 400 can be attached, for example, to an electronic or optoelectronic module that does not include a bail-actuated latch mechanism, but can also be attached to electronic or optoelectronic module that do include a bail-actuated latch mechanism.

The present invention may be embodied in other specific forms without departing from its spirit or essential characteristics. The described embodiments are to be considered in all respects only as illustrative and not restrictive.

What is claimed is:

1. An optoelectronic module classification clip comprising:
   a body;
   a complementary structure attached to the body and configured to engage a complementary structure of a shell of an optoelectronic module; and
   a visible indicator included on at least a portion of the body or the complementary structure attached to the body that indicates information concerning a characteristic of the optoelectronic module.

2. The optoelectronic module classification clip as recited in claim 1, wherein the optoelectronic module classification clip is a substantially monolithic component.

3. The optoelectronic module classification clip as recited in claim 2, wherein the optoelectronic module classification clip is formed from one of PS66, Ultem®, polycarbonate, or ABS.

4. The optoelectronic module classification clip as recited in claim 1, wherein the visible indicator comprises a color included on the body or the complementary structure.

5. The optoelectronic module classification clip as recited in claim 1, wherein the visible indicator comprises characters included on the body or the complementary structure.

6. The optoelectronic module classification clip as recited in claim 1, wherein the characteristic of the optoelectronic module includes one of data rate, wavelength, communication protocol, form factor, manufacturer, or vendor of the optoelectronic module.

7. The optoelectronic module classification clip as recited in claim 1, wherein the visible indicator further indicates information concerning one or more additional characteristics of the optoelectronic module.

8. An optoelectronic module classification clip comprising:
   a base;
   a pair of arms extending from the base, each arm configured to engage a complementary structure of a shell of an optoelectronic module, at least a portion of the base or one of the arms having a color that corresponds to a wavelength associated with the optoelectronic module; and
   a protrusion extending from each arm, the protrusion configured to be received by a complementary cavity defined by the shell of the optoelectronic module.

9. The optoelectronic module classification clip as recited in claim 8, wherein the optoelectronic module classification clip is a substantially monolithic component.

10. The optoelectronic module classification clip as recited in claim 9, wherein the optoelectronic module classification clip comprises one of PA66, Ultem®, polycarbonate, or ABS.

11. The optoelectronic module classification clip as recited in claim 8, further comprising an additional visible indicator that corresponds to information concerning an additional characteristic of the optoelectronic module.

12. The optoelectronic module classification clip as recited in claim 11, wherein the additional characteristic of the optoelectronic module includes one of data rate, communication protocol, form factor, manufacturer, or vendor of the optoelectronic module.

13. An optoelectronic module comprising:
   a shell;
   a transmit port defined in the shell;
   a receive port defined in the shell; and
   a classification clip comprising:
      a body;
      an complementary structure attached to the body and engaged with a complementary structure of the shell; and
      a visible indicator included on at least a portion of the body or the complementary structure attached to the body that indicates information concerning one or more characteristics of the optoelectronic module.

14. The optoelectronic module as recited in claim 13, wherein the classification clip is a substantially monolithic component.

15. The optoelectronic module as recited in claim 14, wherein the classification clip is formed from one of PS66, Ultem®, polycarbonate, or ABS.

16. The optoelectronic module as recited in claim 13, wherein the visible indicator comprises color included on the body or the complementary structure.

17. The optoelectronic module as recited in claim 13, wherein the characteristic of the optoelectronic module includes one of data rate, wavelength, communication protocol, form factor, manufacturer, or vendor of the optoelectronic module.

18. The optoelectronic module as recited in claim 13, wherein the visible indicator further indicates information concerning one or more additional characteristics of the optoelectronic module.

19. The optoelectronic module as recited in claim 13, wherein the optoelectronic module is substantially compliant with the SFP+ (IPF) MSA.

20. The optoelectronic module as recited in claim 13, wherein the complementary structure attached to the body is engaged with the complementary structure of the shell such that the body is positioned above transmit and receive ports and functions as a stop for clips of optical connectors when the optical connectors are positioned within the transmit and receive ports.

* * * * *

UNITED STATES PATENT AND TRADEMARK OFFICE
CERTIFICATE OF CORRECTION

PATENT NO. : 7,320,551 B1 Page 1 of 1
APPLICATION NO. : 11/738369
DATED : January 22, 2008
INVENTOR(S) : Moore et al.

It is certified that error appears in the above-identified patent and that said Letters Patent is hereby corrected as shown below:

Column 4
Lines 63-64, delete "in the direction of the arrow 256"

Column 6
Line 63, change "module" to --modules--

Column 8
Line 27, change "PS66" to --PA66--

Signed and Sealed this

Twentieth Day of July, 2010

David J. Kappos
*Director of the United States Patent and Trademark Office*